(12) United States Patent
Iida et al.

(10) Patent No.: US 6,613,415 B2
(45) Date of Patent: Sep. 2, 2003

(54) EMBLEM HAVING A FASTENING STRUCTURE

(75) Inventors: Hitoshi Iida, Aichi-ken (JP); Chisato Masuya, Aichi-ken (JP); Tadashi Yamamoto, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 41 days.

(21) Appl. No.: 09/735,639

(22) Filed: Dec. 14, 2000

(65) Prior Publication Data

US 2001/0005541 A1 Jun. 28, 2001

(30) Foreign Application Priority Data

Dec. 14, 1999 (JP) .............................. 11-354490

(51) Int. Cl.⁷ .............................. B32B 3/10; B32B 18/00; B32B 3/26; B32B 31/12; B60R 16/00; B60R 21/00; B60R 21/16; B60R 21/20
(52) U.S. Cl. .................... 428/139; 280/727; 280/728.1; 280/728.2; 280/728.3; 264/135
(58) Field of Search .................... 428/139; 280/727, 280/728.1, 728.2, 728.3; 264/135

(56) References Cited

U.S. PATENT DOCUMENTS 4,481,160 A * 11/1984 Bree .......................... 264/135
5,529,336 A * 6/1996 Eckhout .................... 280/728.3
6,053,526 A * 4/2000 Preisler et al. ........... 280/728.2
6,180,207 B1 * 1/2001 Preisler et al. .............. 428/139

FOREIGN PATENT DOCUMENTS

| DE | A 11 827 | 5/1953 |
| DE | 1778666 A1 | 5/1968 |
| DE | 1778705 A1 | 5/1968 |
| DE | 2201007 A1 | 1/1972 |
| DE | 2836016 A1 | 8/1978 |
| DE | 3543105 A1 | 12/1985 |
| DE | 3608875 A1 | 3/1986 |
| DE | 29507066 U1 | 4/1995 |
| JP | 11-314554 | 11/1999 |

* cited by examiner

Primary Examiner—Harold Pyon
Assistant Examiner—Patricia L. Nordmeyer
(74) Attorney, Agent, or Firm—Posz & Bethards, PLC

(57) ABSTRACT

A structure and method for fastening an emblem to a molded article by inserting thermoplastic resin mounting feet, protruding from the emblem, through holes formed in the molded article and subsequent thermal deformation of the feet to establish a secure attachment.

6 Claims, 6 Drawing Sheets

EMBLEM HAVING A FASTENING STRUCTURE

FIELD OF THE INVENTION

The present invention relates to a structure and process for attaching emblems or marks to molded articles. More particularly, the present invention relates to a structure and process for securely attaching emblems in a simple and efficient manner to vehicle airbag covers.

BACKGROUND OF THE INVENTION

Conventional airbag equipment is commonly attached to the steering wheel pads of vehicles. The coverings that overlap such airbag equipment typically include emblems. The emblems are typically formed in the following manner: Referring to FIG. 8, the approach depicts a cover 31 being injection-molded using a synthetic resin material whereby the mark is forged onto the molding surface providing shape which forms an emblem 32 on the surface of the cover 31. Since the emblem 32 is formed integrally on the surface of the cover 31 with the same synthetic resin material, the emblem 32 fails to be distinctive and lacks aesthetically pleasing qualities.

In an attempt to overcome this problem, the approaches shown in FIGS. 9 and 10 have been proposed. In these illustrations, emblems 33 and covers 31 are molded separately, and the emblems 33 each have a surface layer 33a formed by plating or an equivalent method. Each cover 31 has a plurality of through holes 34, and each emblem 33 has a plurality of mounting feet 35, which engage with holes 34, respectively.

In the illustration depicted in FIG. 9, a stopper 36, such as a clip, is engaged about to the tip of each mounting foot 35 to fasten the emblem 33 to the cover 31. Alternatively, in FIG. 10, a screw 37 is driven into the tip of each mounting foot 35 to fasten the emblem 33 to the cover 31. A washer 38 may be located between the screw 37 and the emblem 33.

However, the examples in FIGS. 9 and 10 require a plurality of fastening pieces such as stoppers 36, screws 37 and washers 38, in addition to the independent emblems 33. This increases the number of necessary parts and requires the fastening of each mounting foot 35. Therefore, mounting of the emblem 33 to the cover 31 becomes a complicated procedure thereby increasing the associated production costs.

To alleviate these problems, an insert molding method has been proposed where an emblem, which has been previously molded, is set in a cover-forming mold, and a resin material is injected into the mold to attach the emblem to the cover. Although mounting the emblem to the cover is facilitated, the surface of the accessory is likely to be flawed when the cover is molded with the emblem in the mold. Thus, in addition to being difficult to use, this method also has a poor product yield.

SUMMARY OF THE INVENTION

The present invention was formulated to resolve problems presented by the approaches described above. The present invention is directed towards providing a support structure for mounting parts towards molded articles. The support structure provides a cost effective, simple apparatus which minimizes the number of parts needed.

In order to achieve the above objective, a fastening structure for mounting an emblem to a molded article is required. The fastening structure, comprising a thermoplastic resin foot with a distal end protruding from the emblem, is inserted through a hole formed in the molded article. The emblem is then secured to the molded article by thermally deforming the distal end.

Other aspects and advantages of the invention will become apparent from the following description, when viewed in conjunction with the accompanying drawings, illustrating by way of example the principles of the invention.

BRIEF DESCRIPTION OF THE DRAWINGS

The features of the present invention are set forth with particularity in the appended claims. The invention, together with the objects and advantages thereof, may best be understood by reference to the following descriptions of the preferred embodiments in addition to the accompanying drawings where:

DETAILED DESCRIPTION OF THE PREFERRED EMBODIMENTS

A first embodiment of the present invention is described below referring to FIGS. 1 to 3. The invention is a mounting structure for mounting an accessory onto a pad cover of vehicle airbag equipment.

Figure 1:
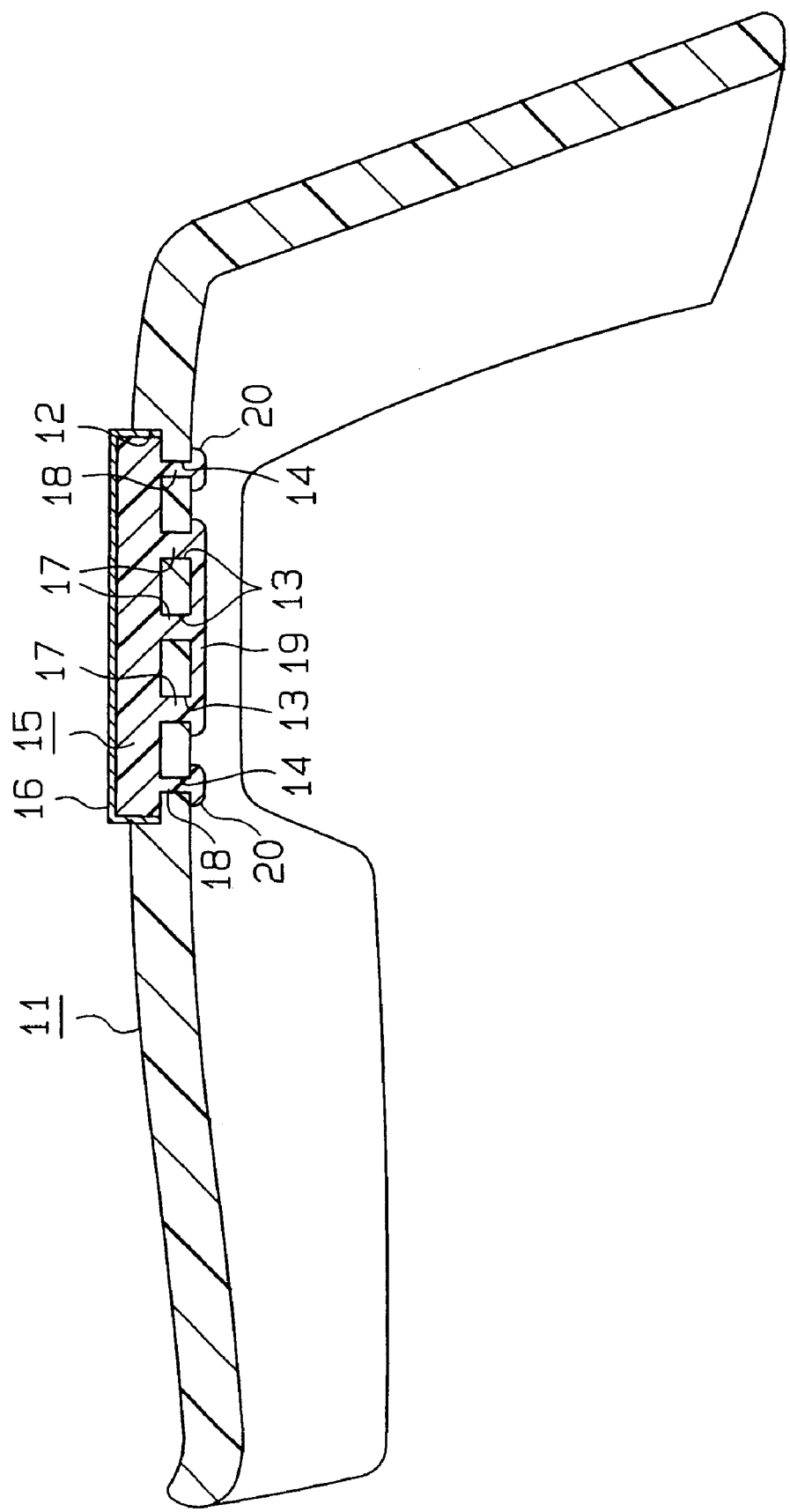
FIG. 1 is a cross-sectional view showing a structure for attaching an emblem to a pad cover of airbag equipment, which is attached to a steering wheel, according to a first embodiment of the present invention.

As shown in FIG. 1, a pad cover 11 is a single article, which is molded using an elastic synthetic resin material, such as an olefin thermoplastic elastomer (hereinafter TPO), a urethane thermoplastic elastomer (hereinafter TPU) or a polyurethane foam (hereinafter PU). The pad cover 11 has a mounting recess 12 formed on its surface. A plurality of large through holes 13 having a relatively large diameter, are defined near the center of the mounting recess 12. Further, a plurality of small through holes 14, having a relatively small diameter, are formed near the periphery of the mounting recess 12.

Figure 3:
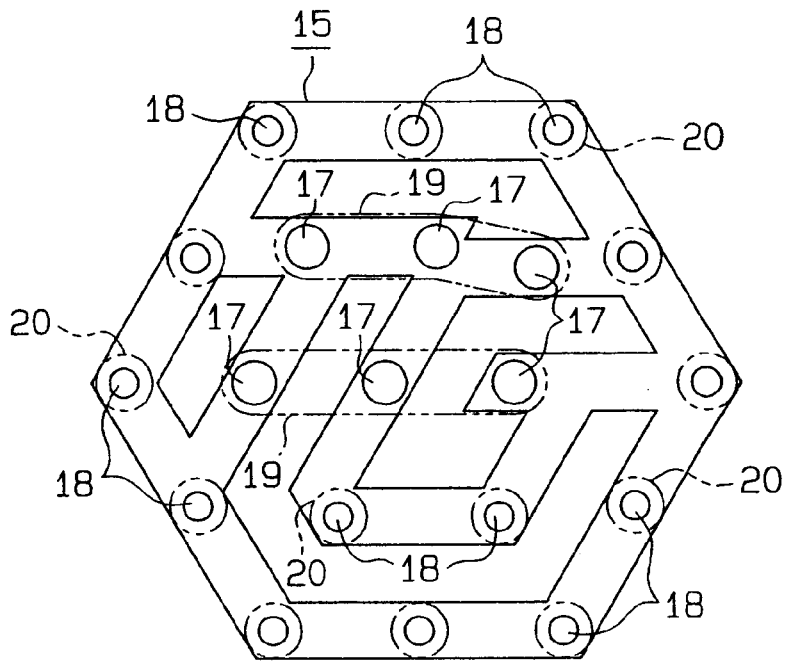
FIG. 3 is a rear view showing an example of the emblem used in the process shown in FIG. 2.

As shown in FIGS. 1 and 3, an emblem 15 is mounted on the pad cover 11 through the mounting recess 12. The emblem support 15 is molded using a thermoplastic resin such as polypropylene (hereinafter PP) or an ABS resin
} independent of the pad cover 11. The support 15 is molded to have the shape of an emblem. A surface layer 16 found along the outer surface of the emblem 15 is formed by incorporating metal plating or the like.

A plurality of large mounting feet 17 are formed on the rear surface of the emblem 15 near the center. The large mounting feet 17 fit into the large through holes 13. A plurality of small mounting feet 18 are formed on the rear surface of the emblem 15 near its periphery. The small mounting feet 18 fit into the small through holes 14. The large mounting feet 17 have a larger diameter and greater volume respectively, when contrasted with the small mounting feet 18.

Figure 2:
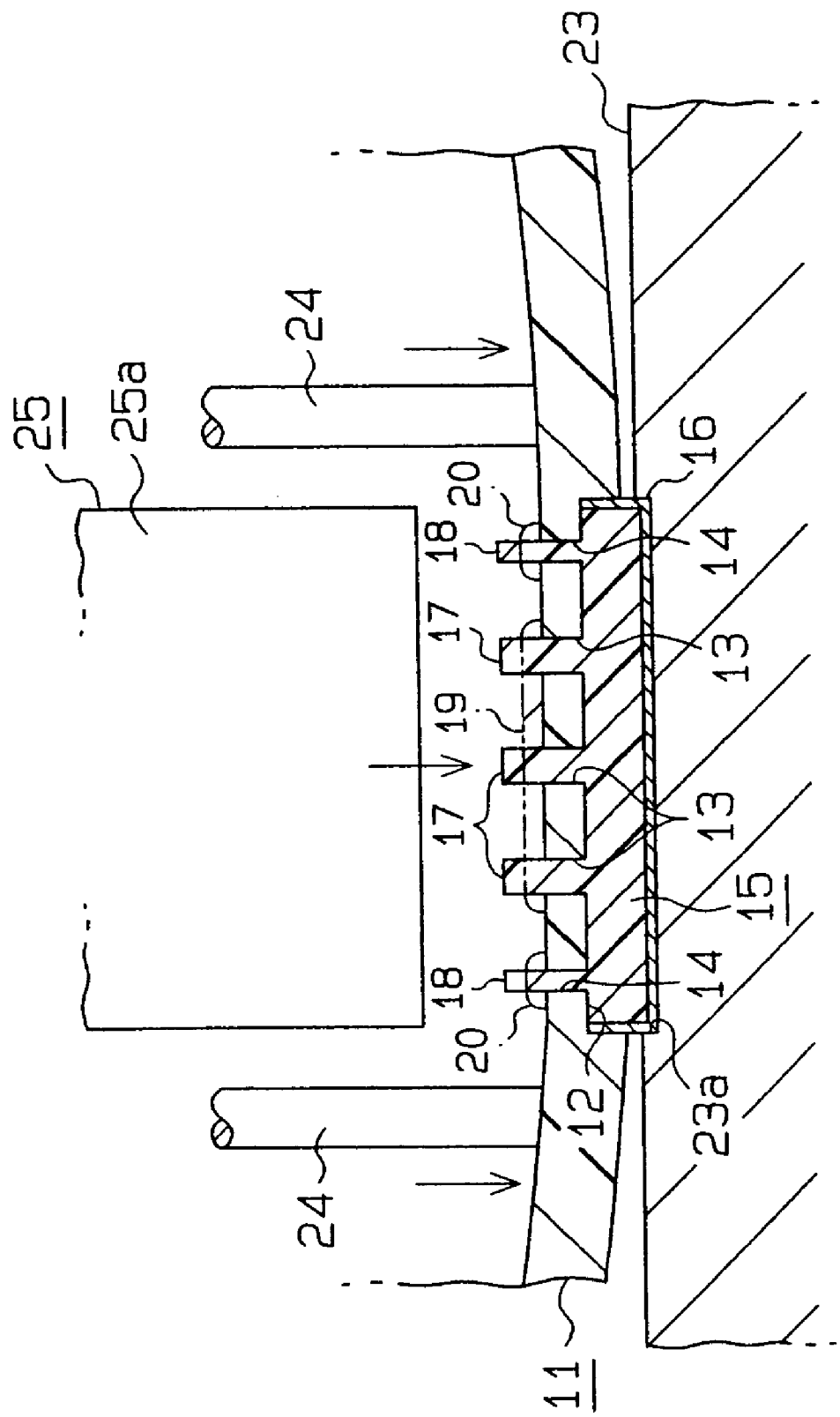
FIG. 2 is an illustration showing how the emblem is mounted onto the pad cover shown in FIG. 1.

As shown in FIGS. 1 and 2, the large and small mounting feet 17 and 18 are inserted through the corresponding holes 13 and 14 along the pad cover 11, whereby the tips of the large and small mounting feet 17 and 18, respectively, are next thermally deformed. Bridges 19 are formed that run between the tips of the large mounting feet 17 effectively connecting each large mounting foot 17 to one another. An independently formed head 20 is found by thermal deformation of the tip of each small mounting foot 18. The thermal deformation of the tips of the large and small mounting feet 17 and 18, respectively, thereby secure the emblem 15 to the pad cover 11 along the mounting recess 12.

Next, a process for attaching the emblem 15 to the pad cover 11 will be described.

In the mounting process of this embodiment as seen in FIG. 2, the emblem 15 is positioned upside down in a holding recess 23a, found along a jig 23. The pad cover 11 is next placed over the emblem 15, inserting the large and small mounting feet 17 and 18, respectively, of the emblem 15 through the appropriately sized mounting holes 13 and 14 of the pad cover 11. The pad cover 11 is positioned against the emblem 15 by a plurality of pressing pins 24.

Subsequently, a vibrator 25a of an ultrasonic welding machine 25 is lowered to a position in contact with the tips of the large and small mounting feet 17 and 18, respectively, to finely vibrate the tips and initiate thermal deformation. Thus, bridges 19 are formed between the tips of the large mounting feet 17, and a head 20 is formed at the tip of each small mounting foot 18.

As a result, the emblem 15 is firmly fastened at the central portion with the pad cover 11 through large mounting feet 17, which are further connected to one another by bridges 19. At the periphery of the emblem 15, the small mounting feet 18 have heads 20 to prevent the emblem 15 from becoming dislodged from the pad cover 11.

The advantages of the above embodiment are as follows.

In the structure for mounting the emblem 15, the pad cover 11 and the emblem 15 are molded separately. A plurality of through holes 13 and 14 are created in the pad cover 11, and a plurality of large and small mounting feet 17 and 18 protrude from the rear surface of the emblem 15. The large and small mounting feet 17 and 18, respectively, are inserted into the appropriately sized mounting holes 13 and 14, and the tips of the large and small mounting feet 17 and 18, are thermally deformed effectively securing the emblem 15 to the pad cover 11.

As a result, the emblem 15 can be firmly fastened to the pad cover 11 without the use of additional fastening pieces which may include stoppers, screws and washers. In addition, the emblem 15 is firmly fastened to the pad cover 11 by thermally deforming the tips of the large and small mounting feet 17 and 18, respectively, after insertion through appropriately sized mounting holes 13 and 14. Thus, the emblem 15 is attached to the pad cover 11 by a simple, cost effective procedure.

Thermal deformation of the tips of the mounting feet 17 and 18 fills only gaps between the appropriately sized mounting holes 13 and 14 and the large and small mounting feet 17 and 18, respectively, thereby preventing slack between the emblem 15 and the pad cover 11.

When the airbag equipment is activated, a very strong force is applied to the pad cover 11, to the bridges 19 of the large mounting feet 17, and to the heads 20 of the small mounting feet 18. Under such circumstances, the emblem 15 remains fastened securely to the pad cover 11 by the mounting structure described in this embodiment.

In the structure for mounting the emblem 15, the tips of the large mounting feet 17 are thermally deformed to form bridges 19. The tips of the large mounting feet 17 are thereby connected to one another by the bridges 19, and the bridges 19 firmly fasten the emblem 15 onto the pad cover 11.

In the structure for mounting the emblem 15, a plurality of small mounting feet 18, which independently form heads 20 when thermally deformed, are created along the rear surface of the emblem 15. Thus, in addition to the large mounting feet 17, the small feet 18 prevent the emblem 15 from being dislodged from the pad cover 11.

In the structure for mounting the emblem 15, the volume of each large mounting foot 17 is relatively large so that bridges 19 are readily formed as the tips of the feet 17 are thermally deformed. Thus, bridges 19 are formed easily between the tips of the large mounting feet 17 by simply providing large mounting feet 17.

In the structure for mounting the emblem 15, the thermal deformation of the tips of the large and small mounting feet 17 and 18 are intended to be performed by ultrasonic welding. By applying a fine ultrasonic vibration, the tips of the large and small mounting feet 17 and 18 can be thermally deformed with no unwanted effects occurring to the pad cover 11, such as thermal stress.

The tips of the large and small mounting feet 17 and 18 can be thermally deformed simultaneously by contacting the vibrator 25a of the ultrasonic welding machine 25 against the large and small mounting feet tips 17 and 18. Therefore, the procedure for attaching the emblem 15 to the pad cover 11 is a simple, cost effective method of producing the pad cover 11.

Next, a second embodiment of the present invention will be described.

Figure 4:
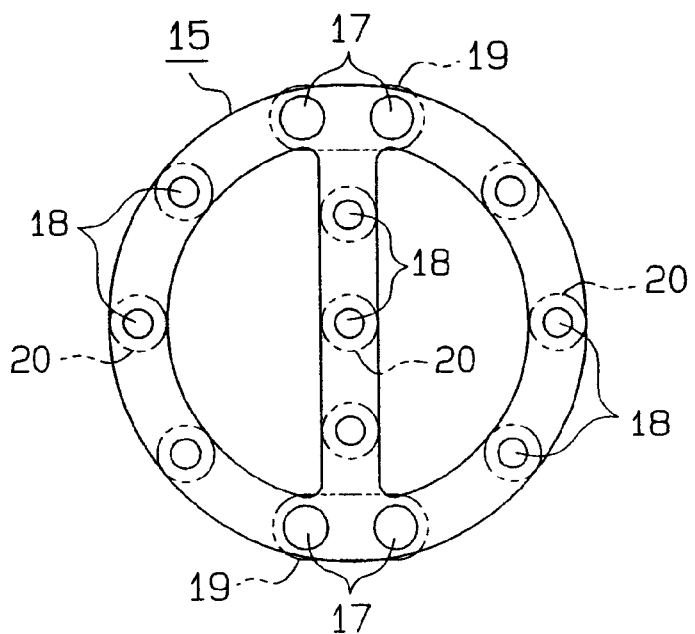
FIG. 4 is a rear view showing an emblem according to a second embodiment of the present invention.

In the second embodiment, as shown in FIG. 4, the 10 configuration of the emblem 15 is different from that depicted in the first embodiment. More specifically, a plurality (two pairs) of large mounting feet 17 are formed to protrude from the periphery of the rear surface of the emblem 15 at opposite sides of the emblem 15. A plurality (nine) of small mounting feet 18 protrude from the rear surface of the emblem 15 both along the periphery and near the center. When the emblem 15 is mounted onto pad cover 11 by thermal deformation of the tips of the large and small mounting feet 17 and 18, a pair of bridges 19 form at opposite locations along the periphery of the emblem 15, while independent heads 20 form around the periphery and center.

Thus, the emblem 15 becomes firmly fastened onto the pad cover 11 along two peripheral sites and is prevented from becoming dislodged from the cover 11 by six peripheral sites and three central sites.

Therefore, the second embodiment has the same advantages as the first embodiment described above.

Figure 5:
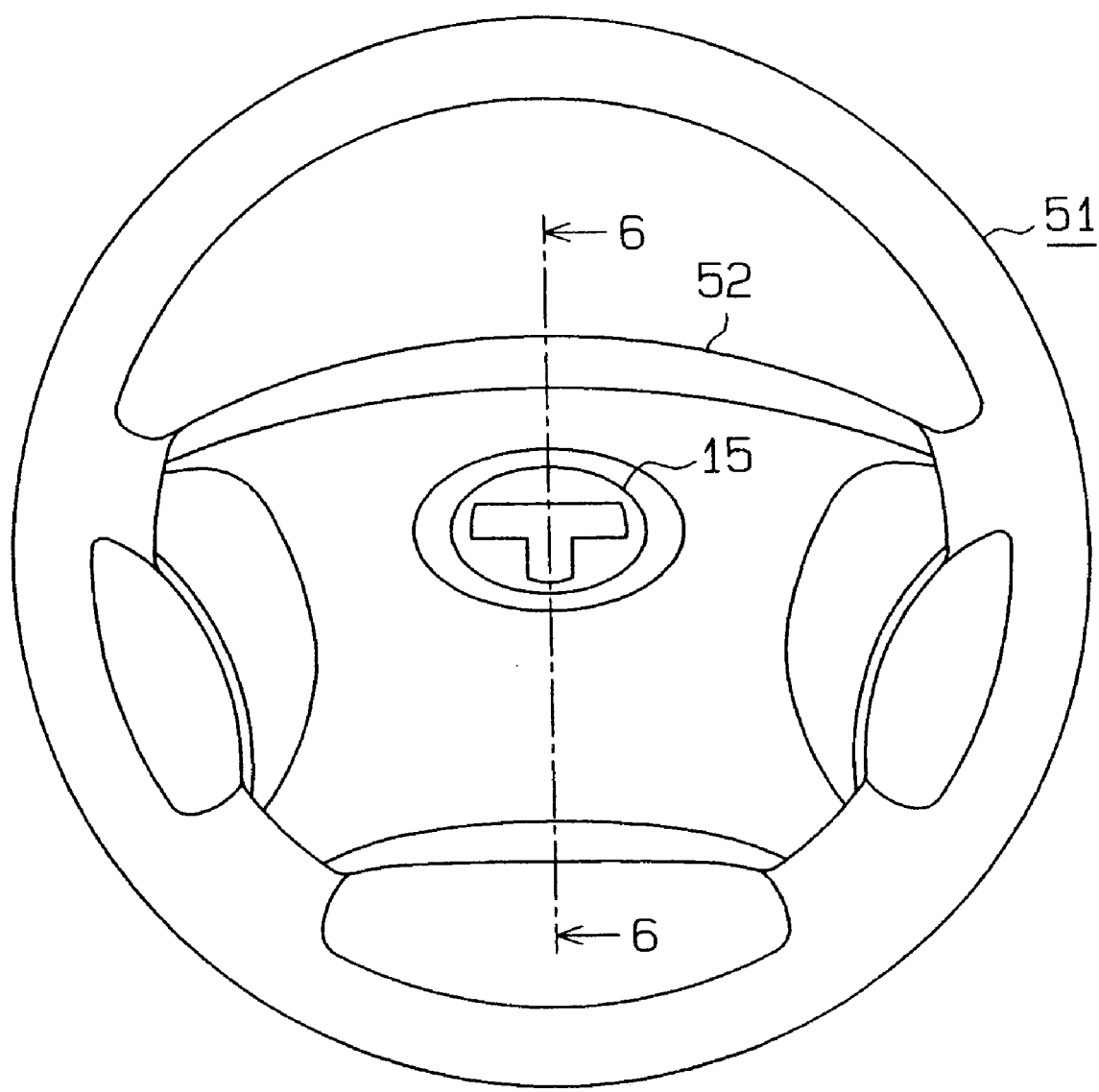
FIG. 5 is a third embodiment of the present invention showing, in front view, a steering wheel having a pad cover and an emblem.
Figure 6:
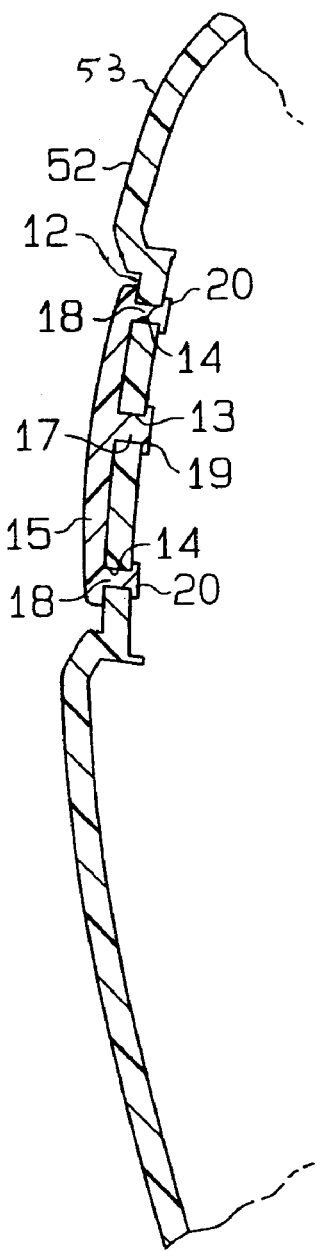
FIG. 6 is a cross-sectional view taken along line 6 in FIG. 5.
Figure 7:
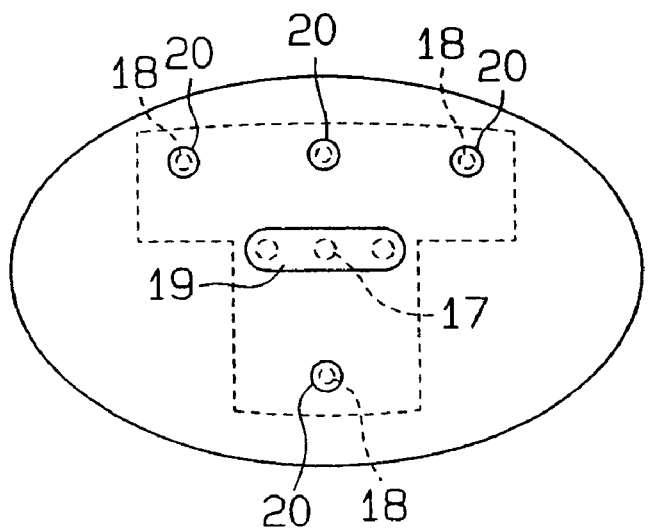
FIG. 7 is a rear view of the cover shown in FIG. 6.
Figure 8:
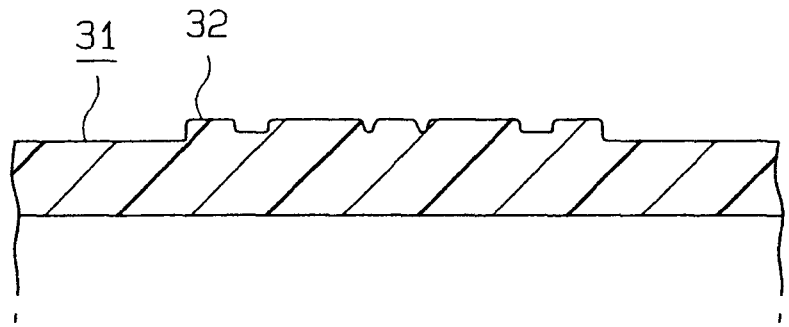
FIG. 8 is a cross-sectional view showing the emblem forming structure according to one example of the prior art.
Figure 9:
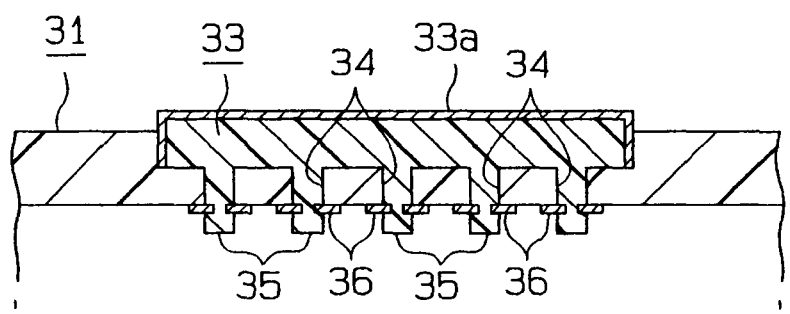
FIG. 9 is a cross-sectional view showing an emblem mounting structure according to one example of the prior art.
Figure 10:
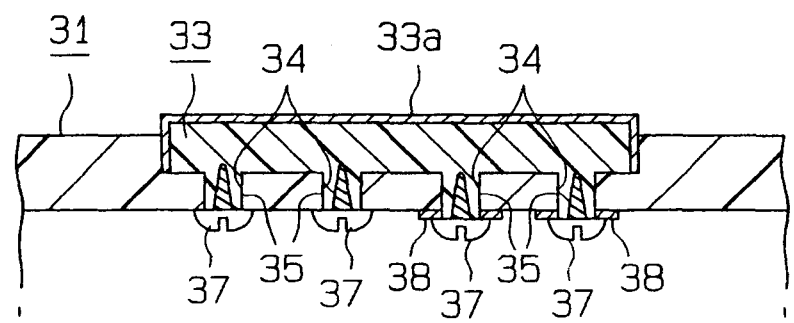
FIG. 10 is a cross-sectional view showing an emblem mounting structure according to another example of the prior art.

Next, a third embodiment of the present invention will be described while referring to FIGS. 5 to 7. A pad 52 is attached to the center of a steering wheel 51 of a vehicle, and airbag equipment (not shown) is contained in pad 52. A pad cover 53 has a mounting recess 12 along the center of the steering wheel 51. An emblem 15, which is located within recess 12, has three large mounting feet 17 and four small mounting feet 18. The large mounting feet 17 are horizontally along the rear surface of the emblem 15 along a substantially horizontal axis. While the small mounting feet 18 are arranged along the rear surface of the emblem 15 along the periphery of the emblem 15.

As seen in the previous embodiment descriptions, if the large and small mounting feet 17 and 18, respectively, are inserted through appropriate sized mounting holes 13 and 14, and are then thermally deformed at the tips, bridges 19 are formed between the large mounting feet 17, while heads 20 are formed on the small mounting feet 18. Thus, the emblem 15 can be firmly fastened to the pad cover 53 thereby preventing the emblem 15 from becoming dislodged.

The invention can be modified in the following manner.

In each of the above embodiments, the large mounting feet 17 may be formed to be of longer length than the small mounting feet 18 in order to provide a greater volume needed in creating the bridge.

In each of the above embodiments, the intervals between each large mounting foot 17 may be less than the intervals between each small mounting foot 18, in order to facilitate formation of bridges 19 between the tips of the large mounting feet 17.

In each of the above embodiments, a plurality of mounting feet of similar configuration may be formed to protrude from the rear surface of the emblem 15 at predetermined intervals, and bridges 19 may be formed between the tips of a predetermined number of the mounting feet by laying connecting materials between the mounting feet. The connecting materials are made of the same thermoplastic resin material as the emblem 15. Then, the tips of the mounting feet are thermally deformed.

In each of the above embodiments, the pad cover 11 and 53 and the emblem 15 may be formed using the same thermoplastic resin material or different thermoplastic resin materials that are compatible with each other, such as TPO and PP or TPU and PU, so that bridges 19 and heads 20 formed at the tips of large and small mounting feet 17 and 18 are integrally welded to the pad cover 11.

In each of the above embodiments, the tips of the large and small mounting feet 17 and 18 may be thermally deformed by hot plate welding or general mechanical oscillation welding.

This invention, embodied in structures for mounting emblems or other parts to molded articles, is not limited to pad covers 11.

In general, the advantages that are produced in the first three embodiments are also produced in these modifications.

What is claimed is:

1. An emblem having a fastening structure on a rear surface thereof for mounting the emblem to a molded article, said emblem comprising:
   a plurality of first thermoplastic resin feet protruding from the rear surface of the emblem, each of said plurality of first feet having a distal end that extends through an opening provided in the molded article; and
   a plurality of second thermoplastic resin feet protruding from the rear surface of the emblem, each of said plurality of second feet having a distal end that extends through an opening provided in the molded article;
   wherein the distal ends of the feet are secured to one another by thermal deformation, which causes the material of the distal ends of said first feet to be joined together to form bridges between adjacent pairs of the first feet;
   wherein the distal ends of the second feet have been thermally deformed to form heads;
   wherein the first feet are located at a central region of the emblem and the second feet are located along a periphery of the emblem; and
   wherein the molded article is a vehicle airbag cover.

2. Th emblem of claim 1, wherein the distal ends of the first feet are larger than the distal ends of the second feet.

3. The emblem of claim 1, wherein three first feet are formed to a common bridge.

4. The emblem of claim 1, wherein the emblem is made of a thermoplastic resin comprising at least one of a polypropylene resin and an Acrylonitrile Butadiene Styrene (ABS) resin.

5. The emblem of claim 1, wherein the emblem has a metal-plated surface layer.

6. The emblem of claim 1, wherein the molded article is made of a synthetic resin material comprising at least one of olefin thermoplastic elastomers, urethane thermoplastic elastomers, and polyurethane foams.

* * * * *